United States Patent
Bai et al.

(10) Patent No.: US 10,183,280 B1
(45) Date of Patent: Jan. 22, 2019

(54) PHOTOCATALYST FOR REMOVING HYDROXYPROPYL GUAR GUM IN FLOW-BACK FLUID OF FRACTURING FLUID AND PREPARATION METHOD AND USE THEREOF

(71) Applicant: Southwest Petroleum University, Chengdu (CN)

(72) Inventors: Yang Bai, Chengdu (CN); Ying Zhou, Chengdu (CN); Liqun Ye, Nanyang (CN); Xian Shi, Chengdu (CN); Yaqin Hu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 16/046,128

(22) Filed: Jul. 26, 2018

Related U.S. Application Data

(63) Continuation of application No. PCT/CN2018/080027, filed on Mar. 22, 2018.

(51) Int. Cl.
*B01J 23/18* (2006.01)
*B01J 27/08* (2006.01)
(Continued)

(52) U.S. Cl.
CPC ............. *B01J 27/08* (2013.01); *B01J 19/127* (2013.01); *B01J 35/004* (2013.01);
(Continued)

(58) Field of Classification Search
CPC ...... B01J 27/08; B01J 19/127; B01J 35/0013; B01J 35/004; B01J 35/1019;
(Continued)

(56) References Cited

U.S. PATENT DOCUMENTS 4,252,570 A * 2/1981 Shannon ................ B82Y 30/00
106/479
6,464,772 B1 * 10/2002 Vermoortele ........ C01G 29/006
106/479
(Continued)

FOREIGN PATENT DOCUMENTS

CN          10-1653732     *  2/2010    ............ B01J 29/03
CN          10-3182315     *  7/2013    ............ B01J 27/06
(Continued)

OTHER PUBLICATIONS

Gang-Juan Lee et al., "Fabrication of hierarchical bismuth oxyhalides (BiOX, X=Cl, Br, I) materials and application of photocatalytic hydrogen production from water splitting." Catalysis Today 307, pp. 197-204. (Year: 2018).*

(Continued)

*Primary Examiner* — Patricia L. Hailey
(74) *Attorney, Agent, or Firm* — Calfee Halter & Griswold LLP

(57) ABSTRACT

The present invention relates to the photocatalyst field, and discloses a photocatalyst for removing hydroxypropyl guar gum in flow-back fluid of fracturing liquid, and a preparation method and the use of the photocatalyst, wherein, the photocatalyst is expressed by $Bi_5O_7Br_{0.5}I_{0.5}$, in a powder form in 12-15 nm particle size, with 285-300 m²/g specific surface area. The photocatalyst has improved response to visible light, has greater specific surface area, and has very high activity in removal of hydroxypropyl guar gum in flow-back fluid of fracturing liquid. In addition, the photocatalyst can be prepared with a simple preparation method under mild conditions, and can be used to remove hydroxypropyl guar gum in flow-back fluid of fracturing liquid.

13 Claims, 1 Drawing Sheet

(51) Int. Cl.
*C01G 29/00* (2006.01)
*B01J 35/00* (2006.01)
*B01J 35/10* (2006.01)
*B01J 37/04* (2006.01)
*B01J 37/03* (2006.01)
*B01J 37/02* (2006.01)
*C09K 8/62* (2006.01)
*B01J 19/12* (2006.01)
*E21B 43/26* (2006.01)

(52) U.S. Cl.
CPC ....... *B01J 35/0013* (2013.01); *B01J 35/1019* (2013.01); *B01J 37/0236* (2013.01); *B01J 37/031* (2013.01); *B01J 37/04* (2013.01); *C01G 29/006* (2013.01); *C09K 8/62* (2013.01); *C01P 2002/72* (2013.01); *C01P 2004/64* (2013.01); *C01P 2006/12* (2013.01); *C09K 2208/10* (2013.01); *E21B 43/26* (2013.01)

(58) Field of Classification Search
CPC ...... B01J 37/0236; B01J 37/031; B01J 37/04; C01G 29/006; C09K 8/62; C09K 2208/10; C01P 2002/72; C01P 2004/64; C01P 2006/12; E21B 43/26
USPC ........................................................ 502/224
See application file for complete search history.

(56) References Cited

U.S. PATENT DOCUMENTS

| | | | |
|---|---|---|---|
| 9,943,833 B2 * | 4/2018 | Gnayem | ................. B01J 35/004 |
| 2013/0334145 A1 * | 12/2013 | Gnayem | ................. B01J 27/08 |
| | | | 210/748.09 |
| 2016/0167991 A1 * | 6/2016 | Sasson | ................. B01J 35/004 |
| | | | 210/748.09 |

FOREIGN PATENT DOCUMENTS

| | | | | |
|---|---|---|---|---|
| CN | 10-3252245 | * | 8/2013 | ............. B01J 27/10 |
| CN | 10-3920509 | * | 7/2014 | ............. B01J 27/06 |
| JP | H0655081 | * | 3/1994 | ............. B01D 15/04 |
| KR | 100816424 | * | 3/2008 | ............. B01J 23/31 |

OTHER PUBLICATIONS

Xiaoli Jin et al., "Bismuth-rich bismuth oxyhalides for environmental and energy photocatalysts." Coordination Chemistry Reviews 340, pp. 84-101. (Year: 2017).*
Hongwei Huang, et al., "Coupling of solid-solution and heterojunction in a 2D-1D core-shell-like BiOCl0.5I0.5/Bi5O7I hierarchy for promoting full-spectrum photocatalysis and molecular oxygen activation." Journal of Colloid and Interface Science 504, pp. 257-267. (Year: 2017).*
Yang Bai et al., "Photocatalytic Mechanism Regulation of Bismuth Oxyhalogen via Changing Atomic Assembly Method." Applied Materials and Interfaces (ACS Publications) 9, pp. 30273-30277. (Year: 2017).*
Yang Bai et al., "Facet-Dependent Photocatalytic N2 Fixation of Bismuth-Rich Bi5O7I Nanosheets." Applied Materials and Interfaces (ACS Publications) 8, pp. 27661-27668. (Year: 2016).*
Yang Liu et al., "Ultrathin porous Bi5O7X (X=Cl, Br, I) nanotubes for effective solar desalination." Journal of Materials Chemistry A, 6, pp. 20037-20043. (Year: 2018).*
Xin Li et al., "Intensive photocatalytic activity enhancement of Bi5O7I via coupling with band structure and content adjustable BiOBrxI1-x." Science Bulletin 63, pp. 219-227. (Year: 2018).*
Zhang et al. (2016). Fabrication of BiOBrxI1-x photocatalysts with tunable visible light catalytic activity by modulating band structures: Scientific Reports 6, 22800.

* cited by examiner

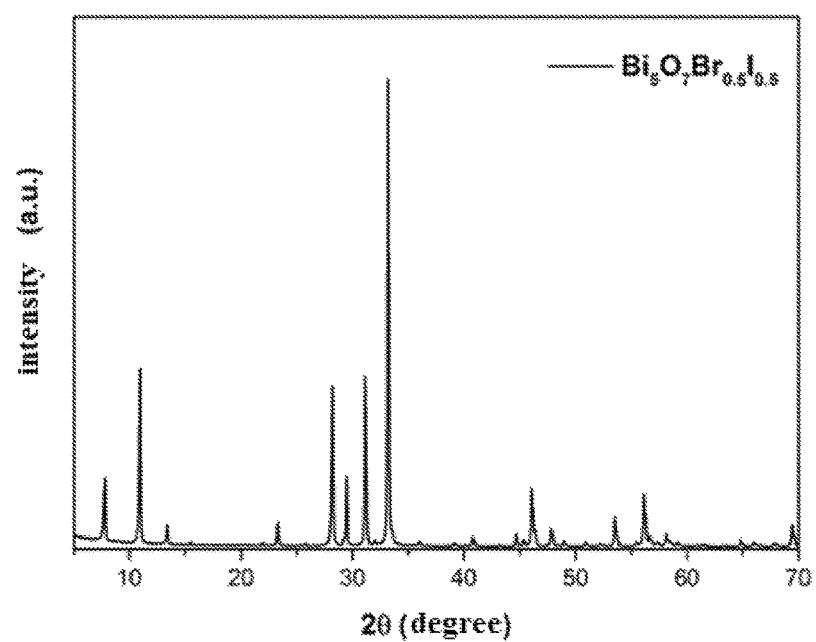

PHOTOCATALYST FOR REMOVING HYDROXYPROPYL GUAR GUM IN FLOW-BACK FLUID OF FRACTURING FLUID AND PREPARATION METHOD AND USE THEREOF

CROSS-REFERENCE TO RELATED APPLICATIONS

This application is a continuation of PCT Application No. PCT/CN2018/080027 filed on Mar. 22, 2018, the contents of which are hereby incorporated by reference as if recited in its entirety.

FIELD OF THE INVENTION

The present invention relates to the photocatalyst, in particular to a photocatalyst for removing hydroxypropyl guar gum in flow-back fluid of fracturing fluid and a preparation method and use of the photocatalyst.

BACKGROUND OF THE INVENTION

Some achievements have been made in the researches on the treatment of flow-back fluid of fracturing fluid produced in the shale gas recovery process in China and foreign countries. Specifically, the majority of inorganic wastes in the flow-back fluid, such as rock cuttings, proppants, and inorganic salts, etc., can be effectively removed through a series of physical settlement and chemical flocculation processes, etc. However, polymers that are hard to degrade in the flow-back fluid, such as high molecular polymers, e.g., guar gum, etc., have to be degraded one by one at the cost of heavy energy consumption or consumption of various kinds of chemical agents, involving drawbacks including high treatment cost, high equipment investment, long treatment cycle, and possible secondary pollution, etc.

Photocatalysis techniques are new techniques developed in the late stage of the twentieth century for treating degradation-resistant organic pollutants, and are characterized in that highly active hydroxyl radicals (.OH) are produced under the action of a semiconductor catalyst. The hydroxyl radicals (.OH) can almost non-selectively oxidize and degrade organic pollutants that are hard to degrade in waste water into non-toxic or low-toxicity small molecular substances, or even directly mineralize them into carbon dioxide, water and other small molecular carboxylic acids, to attain the purpose of innocent treatment. These techniques have advantages including non-selectivity, strong oxidization ability, high reaction velocity, high treatment efficiency, and free of secondary pollution, etc. Owing to those advantages, photocatalysis techniques exhibit a great application space in the treatment of shale gas flow-back fluid. In the field of photocatalysis techniques, the development of photocatalyst is one of the core techniques. Bismuth oxyhalide has become a new favorite in the photocatalysis field in recent years.

As a new narrow bandgap semiconductor, bismuth oxyhalide has become a focal point in the photocatalysis field in recent years. Owing to the characteristics such as nontoxicity, cheapness, strong oxidation-reduction capability, stable chemical properties, and photocorrosion resistance, etc., bismuth oxyhalide has been widely applied in water pollutant degradation and anti-bacteria aspects, etc. However, the high electron-hole recombination efficiency of bismuth oxyhalide monomer has adverse effects to the photocatalytic performance of bismuth oxyhalide, and severely limits the actual application of bismuth oxyhalide in photocatalysis, etc. Therefore, it is one of important subjects in the photocatalysis research field to improve the photocatalytic performance of bismuth oxyhalide-based photocatalysts through modification. Up to now, the reported methods include metal ion doping, non-metallic ion doping, semiconducting solid solution and compounding, etc.

In 2016, Zhang et al. found that in-situ synthesized $BiOI_xBr_{1-x}$ solid solution photocatalyst had stronger photocatalytic activity than the monomer when the photocatalyst was used to catalyze Rhodamine B under irradiation of visible light (Xing, Z., Wang, C. Y., Wang, L. W., Huang, G. X., Wang, W. K., & Yu, H. Q. (2016). Fabrication of $BiOBr_xI_{1-x}$ photocatalysts with tunable visible light catalytic activity by modulating band structures: *Scientific Reports* 6, 22800.).

Though the $BiOI_xBr_{1-x}$ solid solution photocatalyst reported in the above-mentioned document was prepared with the simplest precipitation method, the performance of the photocatalyst itself was still low, and the utilization of light energy was still not ideal. Further modification is required to improve the inherent photocatalytic performance of the photocatalyst.

Therefore, seeking for an economic, effective, and environment friendly polymer degradation technique or process for flow-back fluid of fracturing fluid is especially important for alleviating the environmental problems in the development blocks and of far reaching importance for ensuring normal production and sustainable development of shale gas.

SUMMARY OF THE INVENTION

To solve the above-mentioned problems in the prior art, the present invention provides a photocatalyst for removing hydroxypropyl guar gum in flow-back fluid of fracturing fluid, and a preparation method and the use of the photocatalyst. The photocatalyst has better performance than the existing $BiOI_xBr_{1-x}$ solid solution photocatalyst, the preparation method of the photocatalyst reduces the production cost, simplifies the production process, is simple and requires mild conditions, and $Bi_5O_7Br_{0.5}I_{0.5}$ solid-complex photocatalyst prepared with the method can remove hydroxypropyl guar gum in flow-back fluid of fracturing fluid through photocatalytic oxidization under visible light.

To attain the object described above, in a first aspect, the present invention provides a photocatalyst for removing hydroxypropyl guar gum in flow-back fluid of fracturing fluid. The photocatalyst is expressed by $Bi_5O_7Br_{0.5}I_{0.5}$, is in a powder form in 12-15 nm particle size, and has 285-300 $m^2/g$ specific surface area.

According to the present invention, the particle size is 13-14 nm, and the specific surface area is 287-290 $m^2/g$.

In a second aspect, the present invention provides a method for preparing the photocatalyst for removing hydroxypropyl guar gum in flow-back fluid of fracturing fluid, comprising the following steps:

(1) mixing a bismuth-containing compound, concentrated nitric acid and water to prepare solution A;
(2) preparing water solution B of bromine-containing compound and iodine-containing compound;
(3) adding the solution B into the solution A by dropwise adding under a stirring condition to have a first reaction;
(4) controlling a first product obtained in the step (3) to have a second reaction; and
(5) drying a second product obtained in the step (4).

Preferably, the molar ratio of bismuth of the bromine-containing compound measured in Br to the iodine-containing compound measured in I to the bismuth-containing compound measured in Bi is 1:1:(3-15).

Preferably, the bismuth-containing compound is bismuth nitrate pentahydrate; the iodine-containing compound is potassium iodide and/or sodium iodide, preferably is potassium iodide; the bromine-containing compound is potassium bromide and/or sodium bromide, preferably is potassium bromide.

Preferably, in the step (1), the water is distilled water, and, in relation to 1 mmol said bismuth-containing compound, the dose of the distilled water is 10-50 mL, and the dose of the concentrated nitric acid is 2-5 mL.

Preferably, in the step (2), the water is distilled water, and, in relation to 1 mmol said bromine-containing compound, the dose of the distilled water is 10-50 mL; and, in relation to 1 mmol said iodine-containing compound, the dose of the distilled water is 10-50 mL.

Preferably, in the step (3), the conditions of the first reaction include: stirring for 10-40 min. at 50-100 rpm stirring rate, and the rate of dropwise adding is 1-2.5 mL/min.

Preferably, in the step (4), the conditions of the second reaction include: pressure: 10-15 MPa, temperature: 140-180° C., and time: 14-18 h; preferably, pressure: 12-14 MPa, temperature: 150-170° C., and time: 15-17 h.

Preferably, in the step (5), the conditions of the drying include: drying temperature: 60-80° C., and drying time: 5-24 h; preferably, drying temperature: 65-75° C., and drying time: 7-15 h.

In a third aspect, the present invention provides the use of the above-mentioned photocatalyst or a photocatalyst prepared with the above-mentioned preparation method for removing hydroxypropyl guar gum in flow-back fluid of fracturing fluid under visible light.

The technical scheme provided in the present invention has the following advantages:

(1) In the present invention, the preparation process of the photocatalyst is optimized, and has characteristics including reduced cost and simplified production process;
(2) The photocatalyst provided in the present invention has solid solution-complex dual structures, and has improved photocatalytic activity;
(3) With the bismuth-rich solid solution photocatalyst $Bi_5O_7Br_{0.5}I_{0.5}$ provided in the present invention, under irradiation of visible light with wavelength greater than 420 nm, the removal percentage of hydroxypropyl guar gum in hydroxypropyl guar gum solution with 200 mg/L original COD is as high as 98% within 2 hours, i.e., the photocatalytic performance is greatly improved;
(4) The present invention employs nontoxic components, and thereby harms to human health and ecological environment are reduced;
(5) The photocatalyst prepared in the present invention can be in-situ synthesized in one step without adding any other chemical reagent or any other post-treatment after preparation, i.e., the method is very simple.

DESCRIPTION OF THE DRAWINGS

FIG. 1 is a XRD spectrogram of the photocatalyst prepared according to an example 1 of the present invention.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In a first aspect, the present invention provides a photocatalyst for removing hydroxypropyl guar gum in flow-back fluid of fracturing fluid. The photocatalyst is expressed by $Bi_5O_7Br_{0.5}I_{0.5}$, is in a powder form in 12-15 nm particle size, and has 285-300 $m^2/g$ specific surface area.

In the present invention, the catalyst has solid solution-complex dual structures, greater specific surface area, and improved catalytic activity. It can remove hydroxypropyl guar gum in flow-back fluid of fracturing fluid better through photocatalytic oxidization under irradiation of visible light with wavelength greater than 420 nm; besides, the photocatalyst is non-toxic, and thereby harms to human health and ecological environment are reduced.

In a second aspect, the present invention provides a method for preparing the photocatalyst for removing hydroxypropyl guar gum in flow-back fluid of fracturing fluid, comprising the following steps:

(1) mixing a bismuth-containing compound, concentrated nitric acid and water to prepare solution A;
(2) preparing water solution B of bromine-containing compound and iodine-containing compound;
(3) adding the solution B into the solution A by dropwise adding under a stirring condition to have a first reaction;
(4) controlling a first product obtained in the step (3) to have a second reaction;
(5) drying a second product obtained in the step (4).

According to the preparation method provided in the present invention, the dose of the bismuth-containing compound may be within a wide range, and there is no particular restriction on the dose of the bismuth-containing compound. For example, the molar ratio of the bromine-containing compound measured in Br to the iodine-containing compound measured in I to the bismuth-containing compound measured in Bi is 1:1:(3-15), preferably is 1:1:(10-15), more preferably is 1:1:(10-14), still more preferably is 1:1:(10-11); in the present invention, if the molar ratio of the Br element in the bromine-containing compound to the I element in the iodine-containing compound to the Bi element in the bismuth-containing compound is defined within the above-mentioned range, the prepared catalyst that contains a precursor of the catalyst has the best catalytic effect; in the preparation method provided in the present invention, if the molar ratio of the bromine-containing compound to the iodine-containing compound to the bismuth-containing compound is defined within the above-mentioned range, a bismuth-rich solid solution photocatalyst that has solid solution-complex dual structures, greater specific surface area, and improved catalytic activity can be prepared and obtained, and the obtained photocatalyst can remove hydroxypropyl guar gum in flow-back fluid of fracturing fluid better through photocatalytic oxidization under visible light (under irradiation of visible light with wavelength greater than 420 nm).

According to the preparation method provided in the present invention, the bismuth-containing compound is bismuth nitrate pentahydrate; the iodine-containing compound is potassium iodide and/or sodium iodide, preferably is potassium iodide; the bromine-containing compound is potassium bromide and/or sodium bromide, preferably is potassium bromide.

According to the preparation method provided in the present invention, in the step (1), the water is distilled water, and, in relation to 1 mmol said bismuth-containing compound, the dose of the distilled water may be 10-50 mL; for example, the dose of the distilled water may be 10 mL, 20 mL, 30 mL, 40 mL or 50 mL, preferably is 20 mL; and, in relation to 1 mmol said bismuth-containing compound, the dose of the concentrated nitric acid is 2-5 mL; for example, the dose of the concentrated nitric acid may be 2 mL, 3 mL, 4 mL or 5 mL, preferably is 5 mL. In the present invention, the concentrated nitric acid is obtained commercially, and the concentration of the concentrated nitric acid may be about 68 mass %.

According to the preparation method provided in the present invention, in the step (2), the water is distilled water, and, in relation to 1 mmol said bromine-containing compound, the dose of the distilled water is 10-50 mL; for example, the dose of the distilled water may be 10 mL, 20 mL, 30 mL, 40 mL or 50 mL, preferably is 20 mL. Likewise, in relation to 1 mmol said iodine-containing compound, the dose of the distilled water is 10-50 mL; for example, the dose of the distilled water may be 10 mL, 20 mL, 30 mL, 40 mL or 50 mL, preferably is 20 mL.

Preferably, the step (1) and the step (2) are executed under a stirring condition, wherein, there is no particular restriction on the stirring rate; for example, the stirring rate may be 50-100 rpm.

According to the preparation method provided in the present invention, in the step (3), the first reaction is executed under a stirring condition; there is no particular restriction on the stirring apparatus; for example, the stirring device may be a stirring paddle or stirring pump, etc.; there is no particular restriction on the stirring rate; for example, the stirring rate may be 50-100 rpm; the stirring time may be 10-40 min. Besides, when the solution B is added into the solution A by dropwise adding, the dropwise adding rate may be 1-2.5 mL/min., preferably is 1.5-2 mL/min. In the preparation method provided in the present invention, if the dropwise adding rate is defined within the above-mentioned range, a bismuth-rich solid solution photocatalyst that has solid solution-complex dual structures, greater specific surface area, and improved catalytic activity can be obtained, and the obtained photocatalyst can remove hydroxypropyl guar gum in flow-back fluid of fracturing fluid better through photocatalytic oxidization under visible light (under irradiation of visible light with wavelength greater than 420 nm).

According to the preparation method provided in the present invention, in the step (4), the second reaction preferably is executed in a high-pressure reactor, wherein, the reaction pressure in the reactor may be 10-15 MPa, preferably is 12-14 MPa; the reaction temperature in the reactor may be 140-180° C., such as 140° C., 150° C., 160° C., 170° C. or 180° C.; preferably, the reaction temperature in the reactor is 150-170° C.; more preferably, the reaction temperature in the reactor is 160° C.; besides, the reaction time in the reactor may be 14-18 h, such as 14 h, 15 h, 16 h, 17 h, or 18 h; preferably, the reaction time in the reactor is 15-17 h; more preferably, the reaction time in the reactor is 16 h.

According to the preparation method provided in the present invention, in the step (5), the reactants are washed and dried, wherein, the drying temperature may be 60-80° C.; for example, the drying temperature may be 62° C., 64° C., 66° C., 68° C., 70° C., 72° C., 74° C., 76° C., 78° C. or 80° C.; preferably, the drying temperature is 65-75° C., more preferably is 70° C. Besides, the drying time may be 5-24 h; for example, the drying time may be 5 h, 6 h, 7 h, 8 h, 9 h, 12 h, 15 h, 18 h, 21 h or 24 h; preferably, the drying time is 7-15 h; more preferably, the drying time is 9-12 h; optimally, the drying time is 10 h. In addition, there is no particular restriction on the drying apparatus; for example, the drying may be executed in an oven.

In a third aspect, the present invention provides the use of the above-mentioned photocatalyst or a photocatalyst prepared with the above-mentioned preparation method for removing hydroxypropyl guar gum in flow-back fluid of fracturing fluid under visible light.

The flow-back fluid of fracturing fluid may be an aqueous fracturing fluid; preferably, the aqueous fracturing fluid is a fracturing fluid that contains vegetable gum and its derivatives, a fracturing fluid that contains cellulose derivatives, or a fracturing fluid that contains synthetic polymers. The vegetable gum may comprise sesbania gum, guar gum, flaxseed gum, or fenugreek gum. The flow-back fluid of the aqueous fracturing fluid may contain hydroxypropyl guar gum.

The catalytic activity of the $Bi_5O_7Br_{0.5}I_{0.5}$ photocatalyst prepared in the present invention is better than the photocatalytic activity of the $BiOBr_{0.5}I_{0.5}$ monomer. The specific surface area of the catalyst may be as high as 285-300 m$^2$/g, and the increased specific surface area improves the catalytic activity of the catalyst. The prepared photocatalyst can excite more photo-induced electrons under visible light, has greatly decreased electron-hole recombination rate and obviously improved photocatalytic activity. Especially, the photocatalyst has very high activity in removal of hydroxypropyl guar gum in flow-back fluid of fracturing fluid, can be prepared with a simple preparation method under mild conditions, and attains a purpose of reducing the cost and simplifying the production process. The photocatalyst can be used to remove hydroxypropyl guar gum in flow-back fluid of fracturing fluid.

Hereunder the present invention will be detailed in examples.

Photocatalytic Activity Test:

The photocatalysts obtained in the examples and the comparative examples are tested through photocatalysis test of flow-back fluid of fracturing liquid. The original COD of the flow-back fluid of fracturing liquid is controlled at 200 mg/L. The flow-back fluid of fracturing liquid is irradiated under visible light, wherein, a 500 W xenon lamp is used as a light source, visible light within 420-780 nm range is obtained through an optical filter, and the dose of the catalyst is 0.05 g; after catalytic oxidation, the COD content in the product is measured with a water quality analyzer. The sample volume of the product is 1 mL.

Wherein, COD refers to Chemical Oxygen Demand, i.e., the quantity of reducing substances to be oxidized in the water sample is measured with a chemical method.

The water quality analyzer is model DR6100A, which is from Xi'an Heb Biotechnology Co., Ltd.

In the following examples and comparative examples, the flow-back fluid of fracturing liquid is flow-back fluid of fracturing liquid produced in a shale gas recovery process in China.

Example 1

This example is provided to describe the photocatalyst prepared with the preparation method provided in the present invention and the use of the photocatalyst.

0.4851 g bismuth nitrate pentahydrate (1 mmol) is weighed with an analytical balance and then dissolved in 5 mL concentrated nitric acid and 20 mL distilled water, 1 mmol potassium bromide is prepared and dissolved in 20 mL distilled water, and 1 mmol potassium iodide is prepared and dissolved in the 20 mL distilled water;

The mixed solution that contains potassium iodide and potassium bromide is added with a rubber head dropper by dropwise adding at 1.5 mL/min. dropwise adding rate into the nitric acid solution of bismuth nitrate pentahydrate; in addition, the molar ratio of the bromine-containing compound measured in Br to the iodine-containing compound measured in I to the bismuth-containing compound measured in Bi is 1:1:10; after the mixed solution is stirred by magnetic stirring at 60 rpm stirring rate at room temperature for 30 min., the mixed solution is transferred into a reactor, the reactor is held in an oven at 160° C. for 18 h for reaction, then the product is washed and the precipitate is collected and dried in an oven at 70° C. for 10 h. The obtained solid powder is bismuth-rich solid solution photocatalyst $Bi_5O_7Br_{0.5}I_{0.5}$.

The photocatalyst is SEM characterized; the catalyst is in a powder form, in 12-15 nm particle size;

The photocatalyst is XRD characterized. As shown in FIG. 1, the catalyst is well crystallized, and the peak positions indicate that the catalyst is bismuth-rich solid solution photocatalyst $Bi_5O_7Br_{0.5}I_{0.5}$.

The bismuth-rich solid solution photocatalyst is tested through specific surface area test and photocatalytic activity test, and the results are shown in Table 1.

The bismuth-rich solid solution photocatalyst is tested through a photocatalytic activity test, and the result is shown in Table 1.

Example 2

This example is provided to describe the photocatalyst prepared with the preparation method provided in the present invention and the use of the photocatalyst.

The photocatalyst is prepared with the method described in the example 1, but the molar ratio of the bromine-containing compound measured in Br to the iodine-containing compound measured in I to the bismuth-containing compound measured in Bi is 1:1:11; and, after the mixed solution is stirred by magnetic stirring at 100 rpm stirring rate at room temperature for 40 min., the mixed solution is transferred into a reactor, the reactor is held in an oven at 170° C. for 15 h for reaction, then the product is washed and the precipitate is collected. The precipitate is dried in an oven at 80° C. for 9 h. The obtained solid powder is photocatalyst $Bi_5O_7Br_{0.5}I_{0.5}$.

The photocatalyst $Bi_5O_7Br_{0.5}I_{0.5}$ is tested through specific surface area test and photocatalytic activity test, and the results are shown in Table 1.

The bismuth-rich solid solution photocatalyst is tested through a photocatalytic activity test, and the result is shown in Table 1.

Example 3

This example is provided to describe the photocatalyst prepared with the preparation method provided in the present invention and the use of the photocatalyst.

The photocatalyst is prepared with the method described in the example 1, but the molar ratio of the bromine-containing compound measured in Br to the iodine-containing compound measured in I to the bismuth-containing compound measured in Bi is 1:1:11; and, after the mixed solution is stirred by magnetic stirring at 70 rpm stirring rate at room temperature for 40 min., the mixed solution is transferred into a reactor, the reactor is held in an oven at 150° C. for 17 h for reaction, then the product is washed and the precipitate is collected. The precipitate is dried in an oven at 60° C. for 12 h. The obtained solid powder is bismuth-rich solid solution photocatalyst $Bi_5O_7Br_{0.5}I_{0.5}$.

The bismuth-rich solid solution photocatalyst $Bi_5O_7Br_{0.5}I_{0.5}$ is tested through specific surface area test and photocatalytic activity test, and the results are shown in Table 1.

The bismuth-rich solid solution photocatalyst is tested through a photocatalytic activity test, and the result is shown in Table 1.

Example 4

This example is provided to describe the bismuth-rich solid solution photocatalyst prepared with the preparation method provided in the present invention and the use of the photocatalyst.

The photocatalyst is prepared with the method described in the example 1, but the molar ratio of the bromine-containing compound measured in Br to the iodine-containing compound measured in I to the bismuth-containing compound measured in Bi is 1:1:11; and, after the mixed solution is stirred by magnetic stirring at 120 rpm stirring rate at room temperature for 40 min., the mixed solution is transferred into a reactor, the reactor is held in an oven at 160° C. for 16 h for reaction, then the product is washed and the precipitate is collected. The precipitate is dried in an oven at 70° C. for 10 h. The obtained solid powder is bismuth-rich solid solution photocatalyst $Bi_5O_7Br_{0.5}I_{0.5}$.

The bismuth-rich solid solution photocatalyst $Bi_5O_7Br_{0.5}I_{0.5}$ is tested through specific surface area test and photocatalytic activity test, and the results are shown in Table 1.

The bismuth-rich solid solution photocatalyst is tested through a photocatalytic activity test, and the result is shown in Table 1.

Comparative Example 1

This comparative example is provided to describe the prepared $Bi_4OBr_5Br_2$.

The Preparation Method is as Follows:

2 mmol bismuth nitrate pentahydrate is weighed with an analytical balance and dissolved in 20 mL ethanol, 4 mmol potassium bromide is weighed and dissolved in 30 mL ethanol, solution that contains potassium bromide is added by dropwise adding with a rubber head dropper at 1.5 mL/min. dropwise adding rate into the ethanol solution of bismuth nitrate pentahydrate, the mixed solution is stirred by magnetic stirring at 60 rpm stirring rate for 40 min., and then is transferred into a reactor, then the reactor is held in an oven at 160° C. for 16 h for reaction, and the product is washed and the precipitate is collected. The precipitate is dried in an oven at 70° C. for 10 h. 0.3 g obtained reactant is added into 100 mL distilled water and hydrolyzed at room temperature for 10 h, and the precipitate obtained in the reaction is dried at 70° C. for 10 h; the obtained solid powder is photocatalyst $Bi_4OBr_5Br_2$.

The photocatalyst $Bi_4OBr_5Br_2$ is tested through specific surface area test and photocatalytic activity test, and the photocatalyst is applied to remove hydroxypropyl guar gum in the flow-back fluid of fracturing liquid under visible light. The results are shown in Table 1.

Comparative Example 2

$Bi_4OI_5I_2$ is prepared with the method described in the comparative example 1, but the potassium bromide in the comparative example 1 is replaced with potassium iodide.

The photocatalyst $Bi_4OI_5I_2$ is tested through specific surface area test and photocatalytic activity test, and the photocatalyst is applied to remove hydroxypropyl guar gum in the flow-back fluid of fracturing liquid under visible light. The results are shown in Table 1.

Comparative Example 3

Bismuth-rich solid solution photocatalyst $Bi_5O_7Br_{0.5}I_{0.5}$ is prepared with the method described in the example 1, but, in relation to 1 mmol said bismuth-containing compound, the dose of water is 60 mL, and the dose of concentrated nitric acid is 1 mL.

The photocatalyst $Bi_5O_7Br_{0.5}I_{0.5}$ is tested through specific surface area test and photocatalytic activity test, and the photocatalyst is applied to remove hydroxypropyl guar gum in the flow-back fluid of fracturing liquid under visible light. The results are shown in Table 1.

Comparative Example 4

$BiOBr_{0.5}I_{0.5}$ in the prior art is used, and the photocatalyst $BiOBr_{0.5}I_{0.5}$ is tested through specific surface area test and photocatalytic activity test, and the photocatalyst is applied to remove hydroxypropyl guar gum in the flow-back fluid of fracturing liquid under visible light. The results are shown in Table 1.

TABLE 1

| Examples | BET specific surface area ($m^2/g$) | Average particle size (nm) | Band gap energy (eV) | COD removal ratio at 2 h (%) |
|---|---|---|---|---|
| Example 1 | 287 | 14 | 2.54 | 98 |
| Example 2 | 285 | 15 | 2.55 | 97 |
| Example 3 | 290 | 13 | 2.56 | 96 |
| Example 4 | 289 | 12 | 2.57 | 98 |
| Comparative example 1 | 238 | 27 | 2.86 | 46 |
| Comparative example 2 | 227 | 29 | 2.96 | 40 |
| Comparative example 3 | 201 | 23 | 3.15 | 43 |
| Comparative example 4 | 172 | 25 | 3.18 | 45 |

It is seen from the above examples, comparative examples, and results in Table 1: the bismuth-rich solid solution photocatalyst prepared with the method provided in the present invention has greater specific surface area (287 $m^2/g$) and is in 12-15 nm particle size, and has high hydroxypropyl guar gum removal efficiency under visible light; specifically, as shown in Table 1, the COD removal ratio at 2 h is as high as 98%; in contrast, in the comparative examples 1-4, the COD removal ratio at 2 h is 40-46%; the catalyst prepared in the example 1 has 287 $m^2/g$ specific surface area, and the hydroxypropyl guar gum removal efficiency under visible light is 2 times of that of the single solid solution photocatalyst $BiOBr_{0.5}I_{0.5}$ in the comparative example 4; besides, the value of band gap energy (eV) indicates the energy difference between valence band and conduction band of the catalyst, i.e., the lower the value is, the stronger the electrical conductivity of the catalyst is, the more the electrons excited under light irradiation are, and the stronger the photocatalytic activity is. Therefore, the bismuth-rich solid solution photocatalyst provided in the present invention can remove hydroxypropyl guar gum in the flow-back fluid of fracturing liquid better through photocatalytic oxidization. In addition, the photocatalyst can be prepared with a simple preparation method under mild conditions.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A photocatalyst for removing hydroxypropyl guar gum in flow-back fluid of fracturing fluid, expressed by $Bi_5O_7Br_{0.5}I_{0.5}$, in a powder form in 12-15 nm particle size, having 285-300 $m^2/g$ specific surface area.

2. The photocatalyst according to claim 1, wherein the particle size is 13-14 nm, and the specific surface area is 287-290 $m^2/g$.

3. A method for preparing a photocatalyst for removing hydroxypropyl guar gum in flow-back fluid of fracturing liquid, comprising:
   (1) mixing a bismuth-containing compound, concentrated nitric acid and water to prepare solution A;
   (2) preparing water solution B of bromine-containing compound and iodine-containing compound;
   (3) adding the solution B into the solution A by dropwise adding under a stirring condition to have a first reaction;
   (4) controlling a first product obtained in the step (3) to have a second reaction; and
   (5) drying a second product obtained in the step (4).

4. The preparation method according to claim 3, wherein the molar ratio of the bromine-containing compound measured in Br to the iodine-containing compound measured in I to the bismuth-containing compound measured in Bi is 1:1:(3-15).

5. The preparation method according to claim 3, wherein the bismuth-containing compound is bismuth nitrate pentahydrate; the iodine-containing compound is potassium iodide and/or sodium iodide, the bromine-containing compound is potassium bromide and/or sodium bromide.

6. The preparation method according to claim 3, wherein the bismuth-containing compound is potassium iodide; the bromine-containing compound is potassium bromide.

7. The preparation method according to claim 3, wherein in the step (1), in relation to 1 mmol said bismuth-containing compound, the dose of the water is 10-50 mL, and the dose of the concentrated nitric acid is 2-5 mL.

8. The preparation method according to claim 3, wherein in the step (2), in relation to 1 mmol said compound, the dose of the water is 10-50 mL; and, in relation to 1 mmol said iodine-containing compound, the dose of the water is 10-50 mL.

9. The preparation method according to claim 3, wherein in the step (3), the conditions of the first reaction include: stirring for 10-40 min. at 50-100 rpm stirring rate, and the rate of dropwise adding is 1-2.5 mL/min.

10. The preparation method according to claim 3, wherein in the step (4), the conditions of the second reaction include: pressure: 10-15 MPa, temperature: 140-180° C., and time: 14-18 h.

11. The preparation method according to claim 10, wherein in the step (4), the conditions of the second reaction include: pressure: 12-14 MPa, temperature: 150-170° C., and time: 15-17 h.

12. The preparation method according to claim 3, wherein in the step (5), the conditions of the drying include: drying temperature: 60-80° C., and drying time: 5-24 h.

13. The preparation method according to claim 12, wherein in the step (5), the conditions of the drying include: drying temperature: 65-75° C., and drying time: 7-15 h.

* * * * *